United States Patent
Wang et al.

(10) Patent No.: US 10,901,966 B2
(45) Date of Patent: Jan. 26, 2021

(54) SYNCHRONIZING CONFIGURATIONS FOR CONTAINER HOSTED APPLICATIONS

(71) Applicant: VMware, Inc., Palo Alto, CA (US)

(72) Inventors: Dong Wang, Beijing (CN); Yunfei San, Beijing (CN); Peng Guo, Beijing (CN); Felix Yan, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 548 days.

(21) Appl. No.: 15/250,871

(22) Filed: Aug. 29, 2016

(65) Prior Publication Data

US 2018/0060059 A1 Mar. 1, 2018

(51) Int. Cl.
| | |
|---|---|
| *G06F 9/44* | (2018.01) |
| *G06F 16/22* | (2019.01) |
| *H04L 29/08* | (2006.01) |
| *G06F 9/445* | (2018.01) |
| *G06F 9/455* | (2018.01) |
| *H04L 12/24* | (2006.01) |

(52) U.S. Cl.
CPC ............ *G06F 16/22* (2019.01); *G06F 9/4451* (2013.01); *G06F 9/44505* (2013.01); *G06F 9/45558* (2013.01); *H04L 41/085* (2013.01); *H04L 41/0806* (2013.01); *H04L 41/5041* (2013.01); *H04L 67/34* (2013.01); *G06F 2009/4557* (2013.01); *H04L 41/046* (2013.01)

(58) Field of Classification Search
None
See application file for complete search history.

(56) References Cited

U.S. PATENT DOCUMENTS

| | | | |
|---|---|---|---|
| 9,069,607 B1* | 6/2015 | Gopalakrishna Alevoor | ............ G06F 9/45558 |
| 2015/0309828 A1* | 10/2015 | Shaik | ............ G06F 9/5027 718/1 |
| 2016/0026442 A1* | 1/2016 | Chhaparia | ............ G06F 21/31 717/139 |
| 2016/0378525 A1* | 12/2016 | Bjorkengren | ....... G06F 9/45558 718/1 |

\* cited by examiner

*Primary Examiner* — Wei Y Zhen
*Assistant Examiner* — Lanny N Ung (57) ABSTRACT

An application executing in a containerized environment may be configured at started up by deploying a configuration agent to execute in a container engine. For each container deployed, instantiating a user configuration plugin and one or more applications to execute in the container. The user configuration plugin may send a request to the configuration agent to request for configuration information relating to the application. The configuration plugin may receive configuration information from the configuration agent and used the received configuration information to configure the application.

20 Claims, 8 Drawing Sheets

SYNCHRONIZING CONFIGURATIONS FOR CONTAINER HOSTED APPLICATIONS

BACKGROUND

Container technology is a virtualization technology and is becoming more and more popular and important, as evidenced for example by the rapid growth of Docker™ communities. Container-based virtualization is an approach to virtualization in which the virtualization layer runs as an application within an operating system (OS) of the physical host machine. In this approach, the operating system's kernel runs on the host hardware with one or more isolated guest machines called containers.

With container-based virtualization, there isn't the overhead associated with having each guest run a completely installed operating system. This approach can also improve performance because there is just one operating system taking care of hardware calls. A disadvantage of container-based virtualization, however, is that each guest must use the same operating system the host uses.

Besides being able to run micro services in containers, many organizations show their interests in container based application publishing. Application publishing refers to the deployment and execution of an application on a server (e.g., hosted in a datacenter). Users can remotely access the server-side application via a suitable client-side application. The application's application programming interface (API) is remotely accessed by the client-side application to provide all the interaction with the user; the user perceives the application to be running on their device, but in actuality is running on the server. In cloud environments that support application publishing, container based applications can be deployed in just-in-time mode, which means the container is set up only when a user is trying to access it. Synchronizing configurations for applications running in containers can provide transparent initialization of applications.

SUMMARY

In accordance with embodiments of the present disclosure, a method for configuring an application with user configuration information executing in a container may include deploying a container engine to execute on a first machine. A configuration agent may be deployed to execute on the first machine. One or more containers may be deployed to execute on the container engine. For each container, at least one corresponding application may be instantiated to execute in the container. The container may send a configuration request to the configuration agent for configuration information relating to the application. The configuration request may include information that identifies the container, information that identifies a user associated with the container, and information that identifies the application. The container may receive configuration information from the configuration agent relating to the user's configuration of the application. The application may be configured using the received configuration information.

In some embodiments, the method may further include, for each container, instantiating a configuration plugin to execute in the container. The configuration plugin may communicate with the configuration agent to obtain the configuration information. The configuration plugin may configure the application using the received configuration information.

In some embodiments, the method may further include the configuration agent receiving a request from one of the containers, and in response, the configuration agent may communicate with a server separate from the first machine to obtain configuration information from the server for an application in the container, and send the obtained configuration information to the container. The configuration agent may store the obtained information in a database of the first machine.

In some embodiments, the method may further include the configuration agent receiving a request from one of the containers, and in response, the configuration agent may access configuration information, stored on the first machine, for an application in the container, and send the obtained configuration information to the container.

In some embodiments, the method may further include the configuration agent storing configuration information on the first machine and periodically updating the stored configuration information with information received from a server separate from the first machine.

In some embodiments, the method may further include the configuration agent storing configuration information on the first machine. The configuration agent may receive update information from a first container and update the stored configuration information using the update information.

In some embodiments, the first machine may be a physical computer system. The method may further include deploying an operating system to execute on the physical computer system and deploying the container engine to execute on the operating system.

In some embodiments, the first machine may be a virtual machine. The method may further include deploying a hypervisor to execute on a physical computer system and deploying the virtual machine to execute on the hypervisor.

In accordance with embodiments of the present disclosure, a system for configuring an application with user configuration information executing in a container may include a processor and a computer-readable storage medium having stored thereon executable program code. The executable program code, which when executed by the processor, being configured to cause the processor to deploy a container engine to execute on a first machine, deploy a configuration agent to execute on the first machine, and deploy one or more containers to execute on the container engine. For each container, at least one corresponding application may be instantiated to execute in the container. The container may send to the configuration agent a configuration request for configuration information relating to the application. The configuration request may include information that identifies the container, information that identifies a user associated with the container, and information that identifies the application. The container may receive configuration information from the configuration agent relating to the user's configuration of the application. The application may be configured using the received configuration information.

In some embodiments, the executable program code, which when executed by the processor, may be further configured to cause the processor to instantiate, for each container, a configuration plugin to execute in the container. The configuration plugin may communicate with the configuration agent to obtain the configuration information. The configuration plugin may configure the application using the received configuration information.

In some embodiments, when the configuration agent receives a request from one of the containers, the configuration agent may communicate with a server separate from the first machine to obtain configuration information from the server for an application in the container, and send the obtained configuration information to the container. The obtained information may be stored in a database of the first machine.

In some embodiments, when the configuration agent receives a request from one of the containers, the configuration agent may access configuration information, stored on the first machine, for an application in the container, and send the accessed configuration information to the container.

In some embodiments, the configuration agent may store configuration information on the first machine and periodically update the stored configuration information with information received from a server separate from the first machine.

In some embodiments, the configuration agent may store configuration information on the first machine. The configuration agent may receive update information from a first container and update the stored configuration information using the update information.

In accordance with embodiments of the present disclosure, a non-transitory computer-readable storage medium having stored thereon computer executable instructions, which when executed by a computer device, cause the computer device to deploy a container engine to execute on a first machine, deploy a configuration agent to execute on the first machine, and deploy one or more containers to execute on the container engine. For each container, at least one corresponding application may be instantiated to execute in the container. The container may send to the configuration agent a configuration request for configuration information relating to the application. The configuration request may include information that identifies the container, information that identifies a user associated with the container, and information that identifies the application. The container may receive configuration information from the configuration agent relating to the user's configuration of the application. The application may be configured using the received configuration information.

In some embodiments, the computer executable instructions, which when executed by the computer device, may be further configured to cause the computer device to instantiate, for each container, a configuration plugin to execute in the container. The configuration plugin may communicate with the configuration agent to obtain the configuration information and configure the application using the received configuration information.

In some embodiments, when the configuration agent receives a request from one of the containers, the configuration agent may communicate with a server separate from the first machine to obtain configuration information from the server for an application in the container, and send the obtained configuration information to the container.

In some embodiments, when the configuration agent receives a request from one of the containers, the configuration agent may access configuration information, stored on the first machine, for an application in the container, and send the accessed configuration information to the container.

The following detailed description and accompanying drawings provide further understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
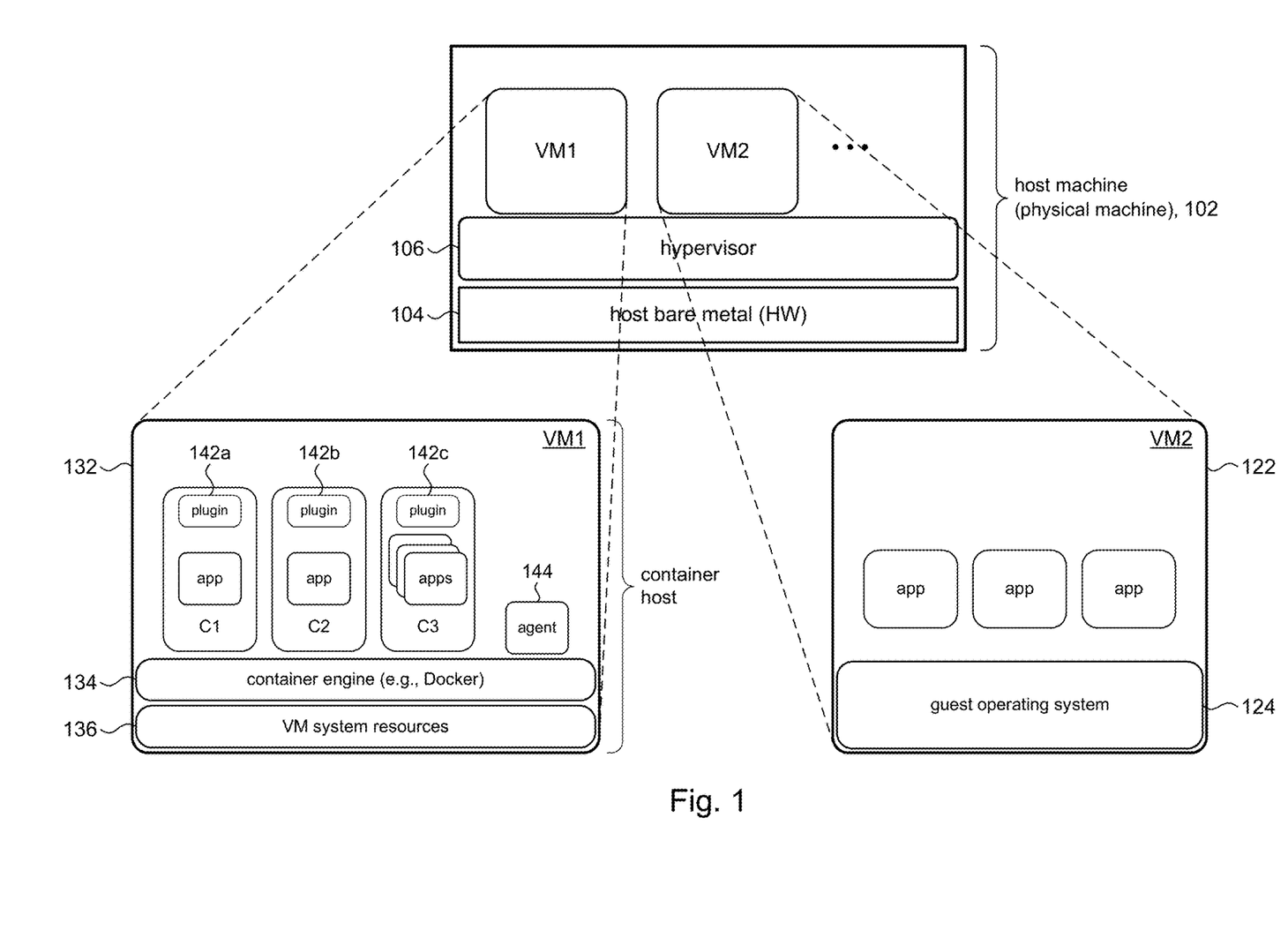
FIG. 1 illustrates an embodiment for user configurations in accordance with the present disclosure.

FIG. 1 shows an example for configuration synchronization of applications executing in a containerized environment in accordance with some embodiments of the present disclosure. A physical machine 102 may comprise hardware components 104, including one or more physical processing elements (e.g., central processing unit (CPU), memory, storage, and so on). In some embodiments, the physical machine 102 may be configured to support a virtualization environment. The physical machine 102, for example, may host a hypervisor 106 (also known as a virtual machine monitor) that executes on the hardware components 104, and thus may be referred to as a "host" machine in this context. The hypervisor 106 may include computer software, firmware, and the like configured to create and run (deploy) virtual machines (VMs) 122, 132 on the host machine 102.

In accordance with embodiments of the present disclosure, the host machine 102 may deploy one or more VMs 132 that can support a containerized environment. For example, a container engine 134 may be deployed to execute in VM 132. An example of a container engine 134 is the Docker™ containerizer platform by Docker, Inc. The hypervisor 106 may provide the VM 132 with system resources 136 such as a virtual CPU, virtual memory, a file system, network access, and so on support the execution of container engine 134.

The container engine 134, in turn, can provide an infrastructure (via the VM system resources 136) to deploy one or more containers C1, C2, C3. Each container C1, C2, C3 may instantiate one or more applications to execute within the computing environment of the respective container C1, C2, C3. In accordance with the present disclosure, each container C1, C2, C3 may instantiate a respective user configuration plugin 142a, 142b, 142c to support the configuration of the application(s) executing in the container. In accordance with the present disclosure, the container engine 134 may deploy a user configuration agent 144 to support the operations of the user configuration plugins 142a-142c. These aspects of the present disclosure are discussed in more detail below.

It will be appreciated that in some embodiments, the host machine 102 may deploy a mix of VMs, including VMs configured for containers and VMs that do not support containers. FIG. 1, for example, shows that a VM 122 may be deployed in host machine 102 to execute a guest operating system (e.g., Windows® OS, Linux™ OS, Mac OS® operating system, etc.) to provide a computing environment (e.g., file system, disk storage, network access, etc.) to support the execution of one or more applications, in addition to VM 132.

Figure 1A:
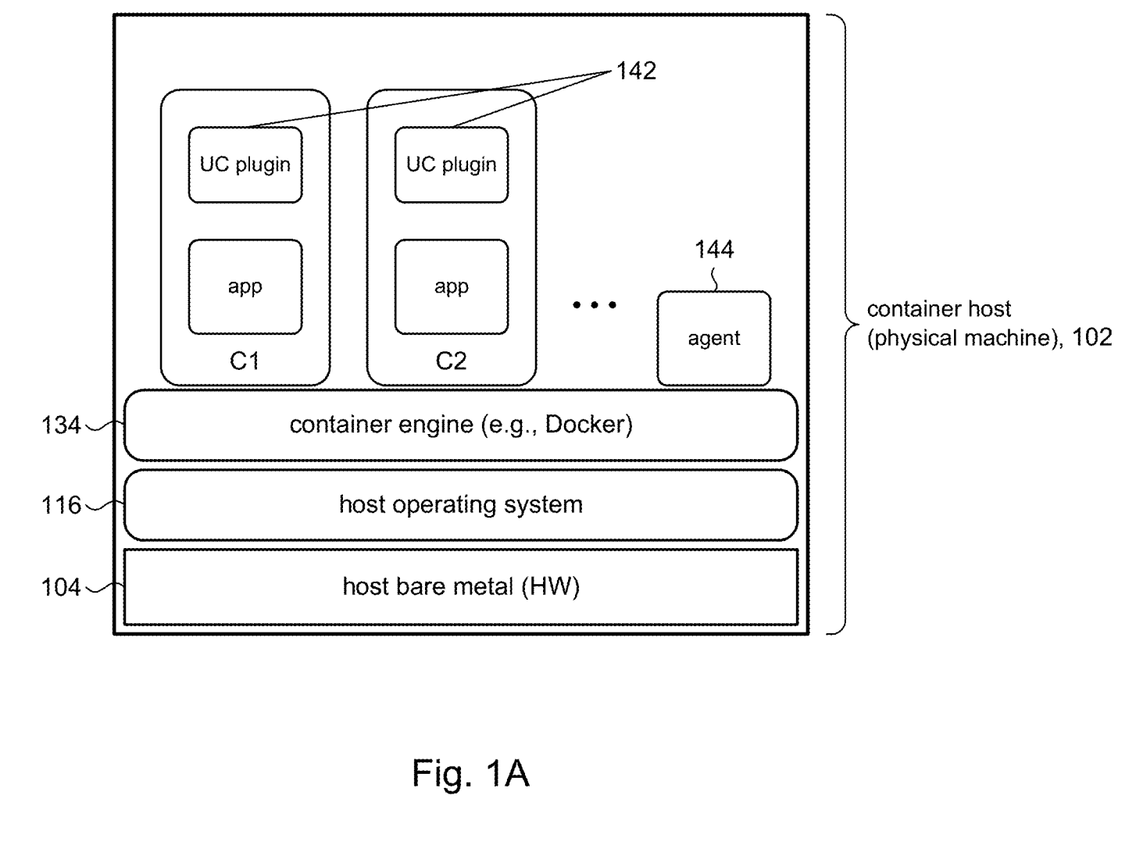
FIG. 1A illustrates another embodiment for user configurations in accordance with the present disclosure.

In some embodiments, the containerized environment may be built directly on the host machine 102. FIG. 1A, for example, shows an example for configuration synchronization of applications executing in a containerized environment in accordance with such an embodiment. The physical machine 102 itself may be configured to support a containerized environment. Accordingly, in some embodiments, the physical machine 102 may be configured with a host operating system (OS) 116 (e.g., Windows® OS, Linux™ OS, Mac OS® operating system, etc.) that executes on the hardware components 104. Container engine 134 may be deployed to execute on the host OS 116.

Similar to FIG. 1, the container engine 134 shown in FIG. 1A can provide the infrastructure to deploy one or more containers C1, C2. Each container C1, C2 may instantiate one or more applications to execute within the computing environment of the container. The containers C1, C2 may instantiate respective user configuration plugins 142 to support the configuration of the application(s) executing in the corresponding container. In accordance with the present disclosure, the container engine 134 may deploy a user configuration agent 144 to support the operations of the user configuration plugins 142. The host OS 116 can provide the same containerized environment in a non-virtualized configuration as provided by VM 132. Going forward, the remaining disclosure can assume without loss of generality the virtualized configuration shown in FIG. 1, with the understanding that the disclosure can be readily applied to the non-virtualized configuration shown in FIG. 1A.

Figure 2:
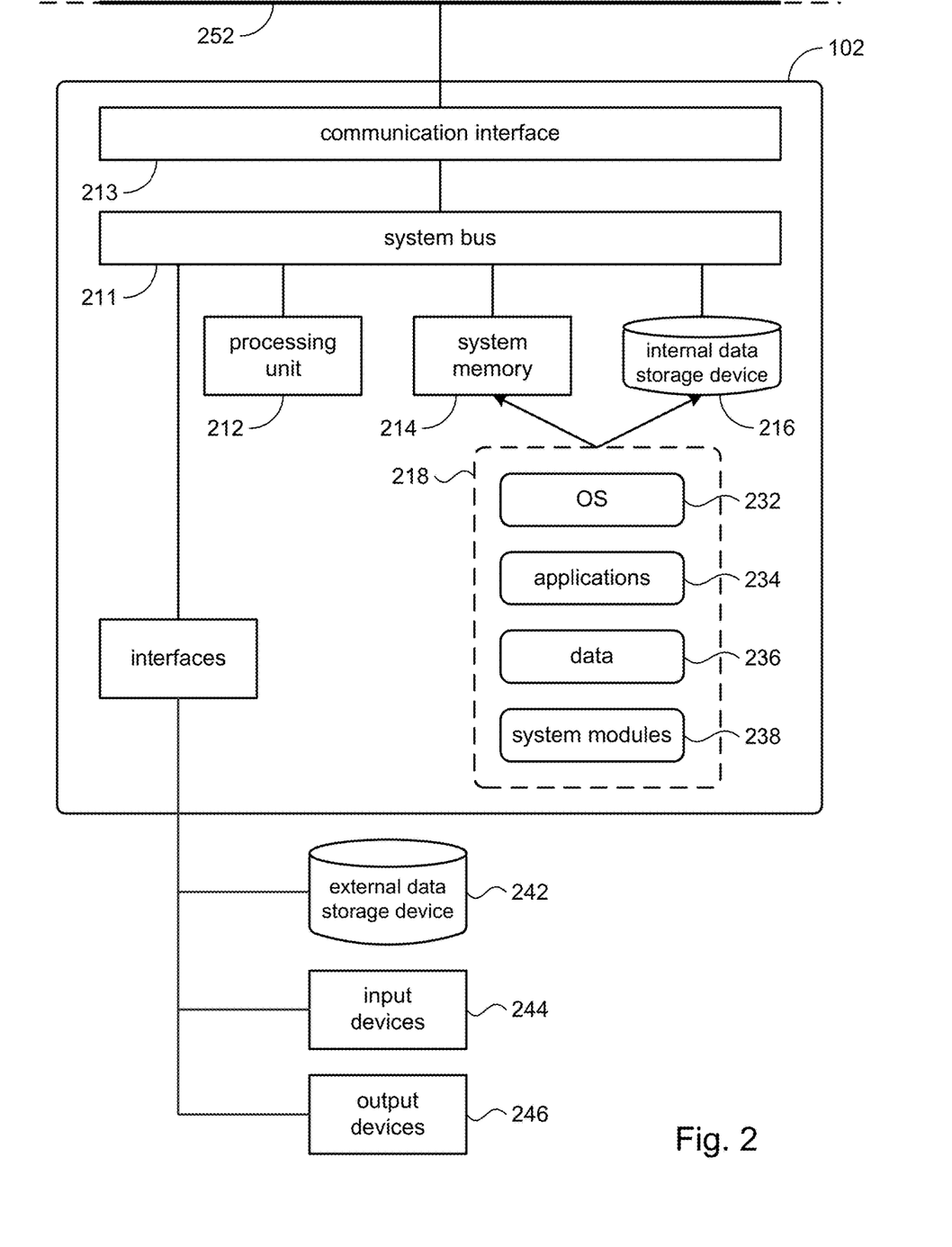
FIG. 2 shows a high level hardware arrangement for user configurations in accordance with the present disclosure.

Referring to FIG. 2, an illustrative implementation of physical machine 102 may include a processing unit 212, a system memory 214, and a system bus 211. The system bus 211 may connect various system components including, but not limited to, the processing unit 212, the system memory 214, an internal data storage device 216, and a communication interface 213. In a configuration where the computer system 202 is a mobile device (e.g., smartphone, computer tablet), the internal data storage 216 may or may not be included.

The processing unit 212 may be a single-processor configuration in some embodiments, or a multi-processor architecture in other embodiments. The system memory 214 may include read-only memory (ROM) and random access memory (RAM). The internal data storage device 216 may be an internal hard disk drive (HDD), a magnetic floppy disk drive (FDD, e.g., to read from or write to a removable diskette), an optical disk drive (e.g., for reading a CD-ROM disk, or to read from or write to other high capacity optical media such as the DVD, and so on). In a configuration where the computer system 202 is a mobile device, the internal data storage 216 may be a flash drive.

The internal data storage device 216 and its constituent non-transitory computer-readable storage media may provide nonvolatile storage of data, data structures, computer-executable instructions, and so forth. Although the description of computer-readable media above refers to a HDD, a removable magnetic diskette, and removable optical media such as a CD or DVD, it is noted that other types of media which are readable by a computer, such as zip drives, magnetic cassettes, flash memory cards, cartridges, and the like, may also be used. Furthermore, such media may contain computer-executable instructions for performing the methods disclosed herein.

The system memory 214 and/or the internal data storage device 216 may store various program and data modules 218, including for example, operating system 232, one or more application programs 234 (e.g., container engine 134, user configuration plugins 142a-142c, user configuration agent 144, and so on), program data 236, and other program/system modules 238. An external data storage device 242 may be connected to the computer system 202 for external storage of data.

Access to the computer system 202 may be provided by a suitable input device 244 (e.g., keyboard, mouse, touch pad, etc.) and a suitable output device 246, (e.g., display screen). In a configuration where the computer system 202 is a mobile device, input and output may be provided by a touch sensitive display.

The computer system 202 may operate in a networked environment using logical connections via wired and/or wireless communications to one or more remote computers (not shown) over a communication network 252. The communication network 252 may be a local area network (LAN) and/or larger networks, such as a wide area network (WAN).

Figure 3:
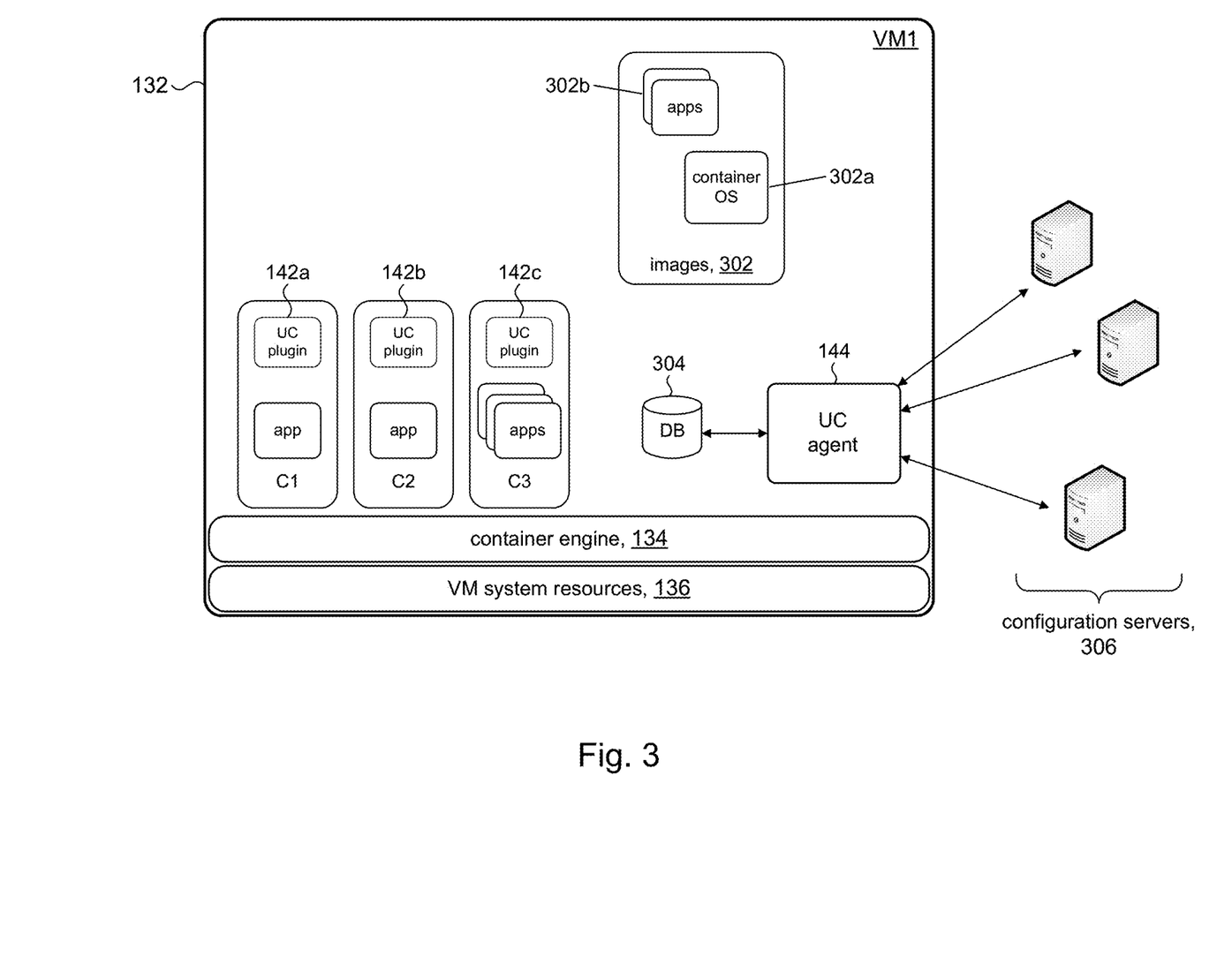
FIG. 3 illustrates details of a containerized environment for user configurations in accordance with the present disclosure.

Referring now to FIG. 3, additional detail is illustrated for configuration synchronization of applications executing in a containerized environment in accordance with embodiments of the present disclosure. In some embodiments, for example, the VM 132 may include an images datastore 302 and a configuration database 304. The images datastore 302 and configuration database 304 may be stored in one or more virtual data stores provided by the VM resources 136. The images datastore 302 may include a baseline container OS image 302a. The baseline container OS may represent the initial state of a container OS; e.g., a freshly installed container OS. The images datastore 302 may include one or more app images. As discussed in more detail below, the app images may represent a current state of execution of an application at the time the user quits, terminates, or otherwise exits the application.

In accordance with the present disclosure, the configuration database 304 may store configuration information (settings, etc.) for applications that execute in the containers C1-C3. The user configuration agent 144 may receive configuration information from the user configuration plugins 142a-142c, and store the received configuration information to the configuration database 304. Conversely, the user configuration agent 144 may read out configuration information from the configuration database 304 and provide the configuration to a user configuration plugin 142a-142c. This aspect of the present disclosure is discussed below.

In accordance with the present disclosure, the user configuration agent 144 may communicate with one or more external configuration servers 306 to store and access configuration information. An example of a configuration server 306 includes the AirWatch™ server by VMware, Inc. which may be used by network administrators to deploy, configure, secure, monitor, manage and support smartphones, tablets, laptops and other devices across multiple mobile platforms and operating systems. The User Environment Manager™ (UEM™) server by VMware, Inc. is another example of a configuration server 306. The UEM™ served can be used to manage Windows™ settings and application settings, allowing application settings to dynamically roam between physical systems and virtual desktops. In general, the user configuration agent 144 may be configured to communicate with any suitable configuration server.

Figure 4A:
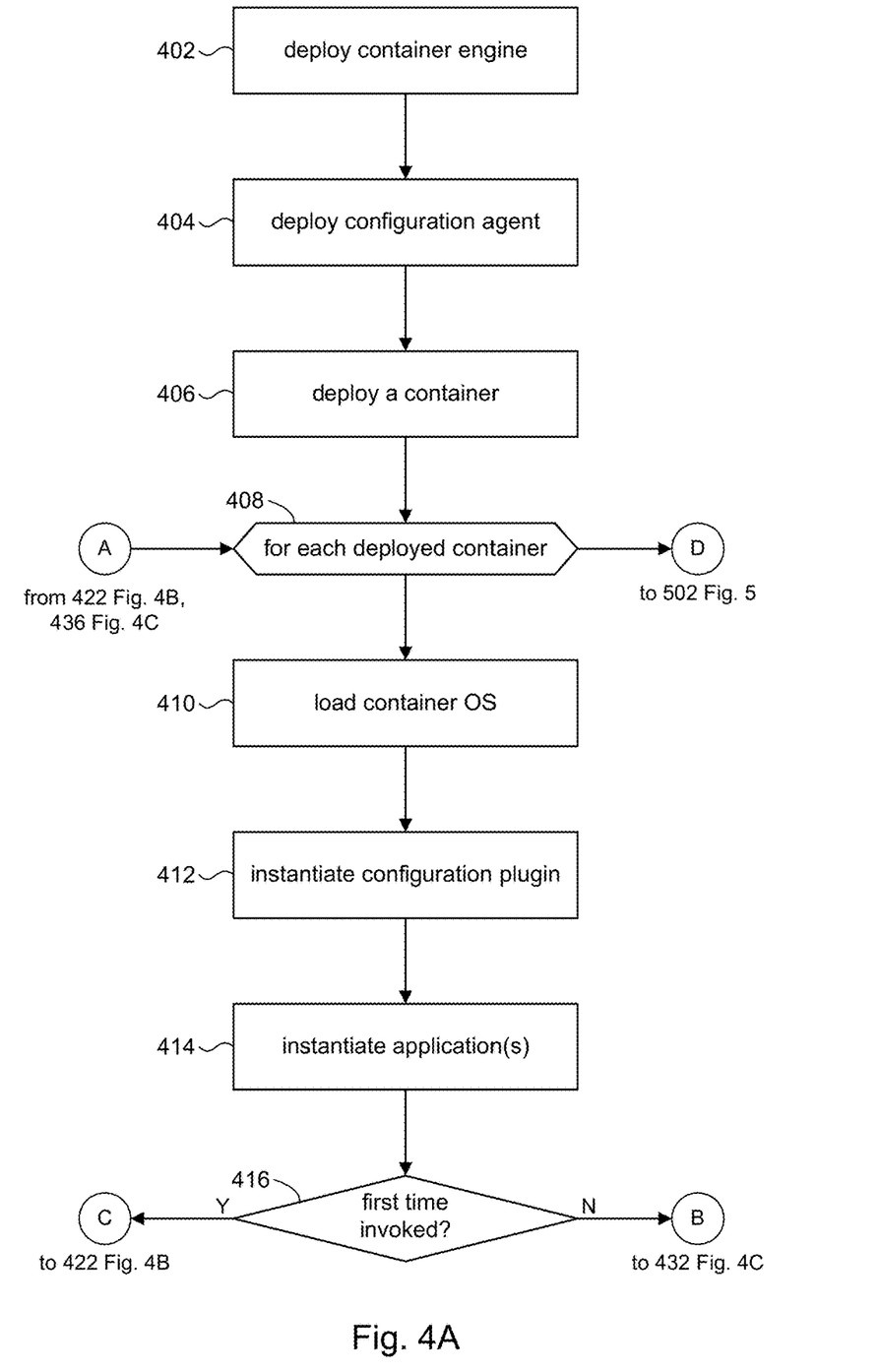
FIGS. 4A, 4B, 4C illustrate high level processing for a user configuration plugin in accordance with the present disclosure.
Figure 4B:
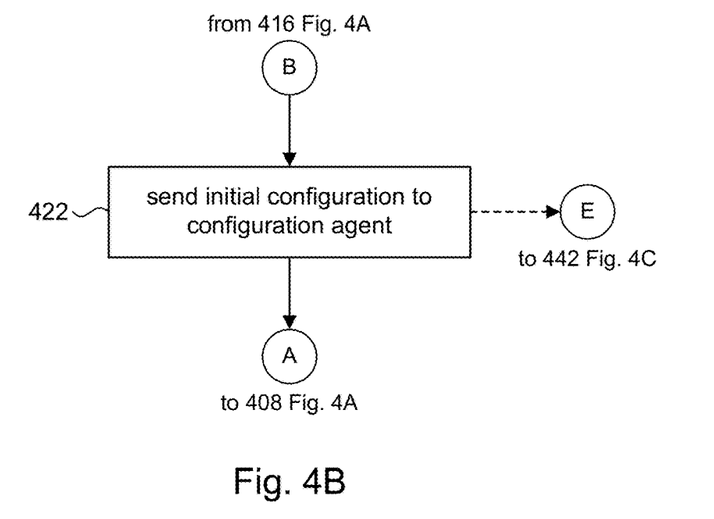
Figure 4C:
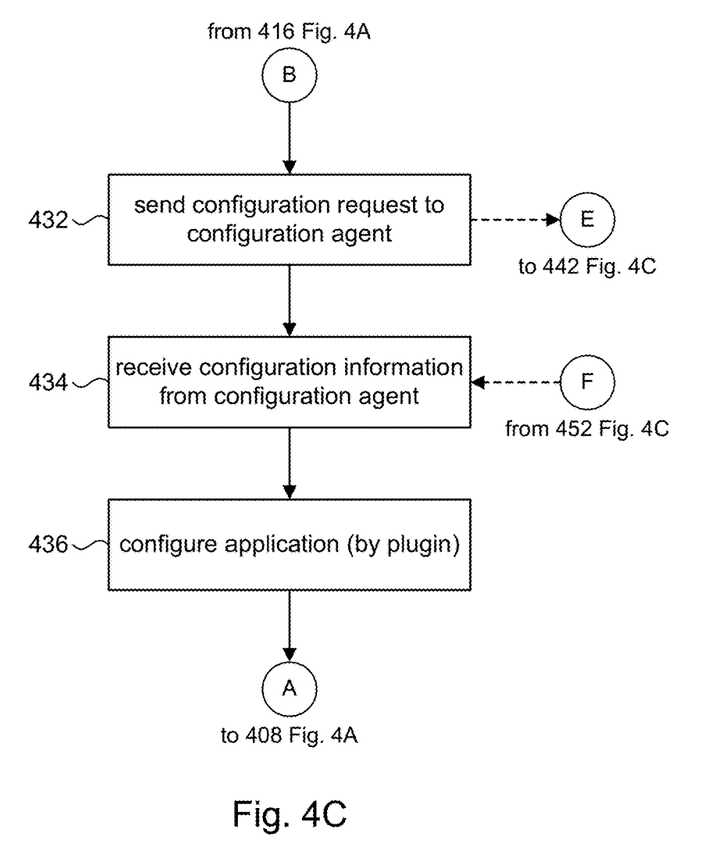

Referring now to FIGS. 4A, 4B, 4C, the discussion will turn to a high level description of some heuristics that can serve to represent configuration synchronization processing in accordance with the present disclosure. In some embodiments, for example, applications 234 may comprise computer executable program code, which when executed by a computer system (e.g., 102, FIG. 1), may cause the computer system to perform processing in accordance with FIGS. 4A, 4B, 4C.

At block 402, the hypervisor 106 may deploy VM 132. When VM 132 boots up, the boot up process may include deploying container engine 134 to execute on VM 132. The container engine 134 provides the infrastructure, via the VM system resources 136, to support execution of one or more containers C1-C3.

At block 404, the VM 132 may deploy the user configuration agent 144 to execute on VM 132. The VM 132 may then go idle and "listen" for user logins.

At block 406, the VM 132 may deploy a container (e.g., C1) to execute on the VM 132. In some embodiments, the VM 132 may be configured to deploy containers in just-in-time mode. For example, the VM 132 may deploy or otherwise set up a container (e.g., C1) to execute on the VM 132 only when a user logs in to start a session or otherwise attempts to access a container, so that container resources can be allocated on an as needed basis.

At block 408, for each container (e.g., C1) that is deployed on VM 132, the container may perform the following:

At block 410, the container may load the container OS image from the images datastore 302. The container OS provides an execution environment (e.g., storage, file system, network access, etc.) via the container engine 134 to support execution of one or more applications. As explained above, the container OS may be a baseline execution state of the container OS.

At block 412, the container may instantiate a user configuration plugin (e.g., 142*a*) to execute in the execution environment of the container OS. The user configuration plugin may listen for configuration changes made to applications that are instantiated in the container.

At block 414, the container may instantiate one or more applications. For example, the user may invoke one or more applications to do some work. The container may load one or more app images from the images datastore 302. For instance, if one or more applications had been executing in the container during the user's previous login session, then one more app images would be stored in the images datastore 302 when that session terminated. The app image can thus retain the execution state of the application from the previous user session. For example, if the application is a web browser, the windows, the open tabs, search input box, and other state information may be preserved. By loading the app image from the previous user session, the user can maintain continuity of execution in a subsequent session.

At block 416, the container may process the configuration information of an application depending on whether the application is a first-time invocation (Y branch) or is instantiated from an app image (N branch). If the application is invoked for the first time, then processing may proceed to block 422 (FIG. 4B), otherwise processing may proceed to block 432 (FIG. 4C).

Referring to FIG. 4B, at block 422, the user configuration plugin may be triggered to synchronize any default configuration settings of an application when it is first invoked. For example, a web browser may default to a specific home page, a word processing application may have certain defaults such as font size, font type, page size, and so on with other applications. The container may store the configuration information for an application in any suitable manner. In some embodiments, for example, the container may use a system registry to store the configuration information. Some applications may store some of their configuration information in one or more special configuration files, in addition to or instead of using the system registry.

Accordingly, in some embodiments, the user configuration plugin may be configured with knowledge about where an application's configuration information is contained. The user configuration plugin may access the default configuration information of the application, for example, from the system registry or in special configuration files. The user configuration plugin may then send such information to the user configuration agent (e.g., over a TCP/IP channel) to be processed in accordance with the present disclosure. The user configuration plugin may include information that identifies the user, information that identifies the application, and so on. Processing may then return to block 408 in FIG. 4A to process another deployed container.

Returning to the decision block 416 in FIG. 4A, if the application has been previously instantiated, then processing may proceed to block 432 to configure a previously instantiated application in accordance with the present disclosure.

Referring to FIG. 4C, at block 432, the user configuration plugin may send a configuration request to the user configuration agent to obtain configuration information for the instantiated application. In some embodiments, for example, the request may include an IP address of the container, user information that identifies the user, information that identifies the application, and so on. Processing by the user configuration agent is explained below in connection with FIG. 4D.

At block 434, the user configuration plugin may receive the requested configuration information from the user configuration agent.

At block 436, the user configuration plugin may configure the application using the configuration information received from the user configuration agent. For example, the user configuration plugin may initialize a portion of a system registry specific to the application with the received configuration information. In some embodiments, where an application may store some of its configuration information in special configuration files, the user configuration plugin may initialize those special configuration files with the some of the received configuration information. Processing may then return to block 408 in FIG. 4A to deploy another container.

Figure 4D:
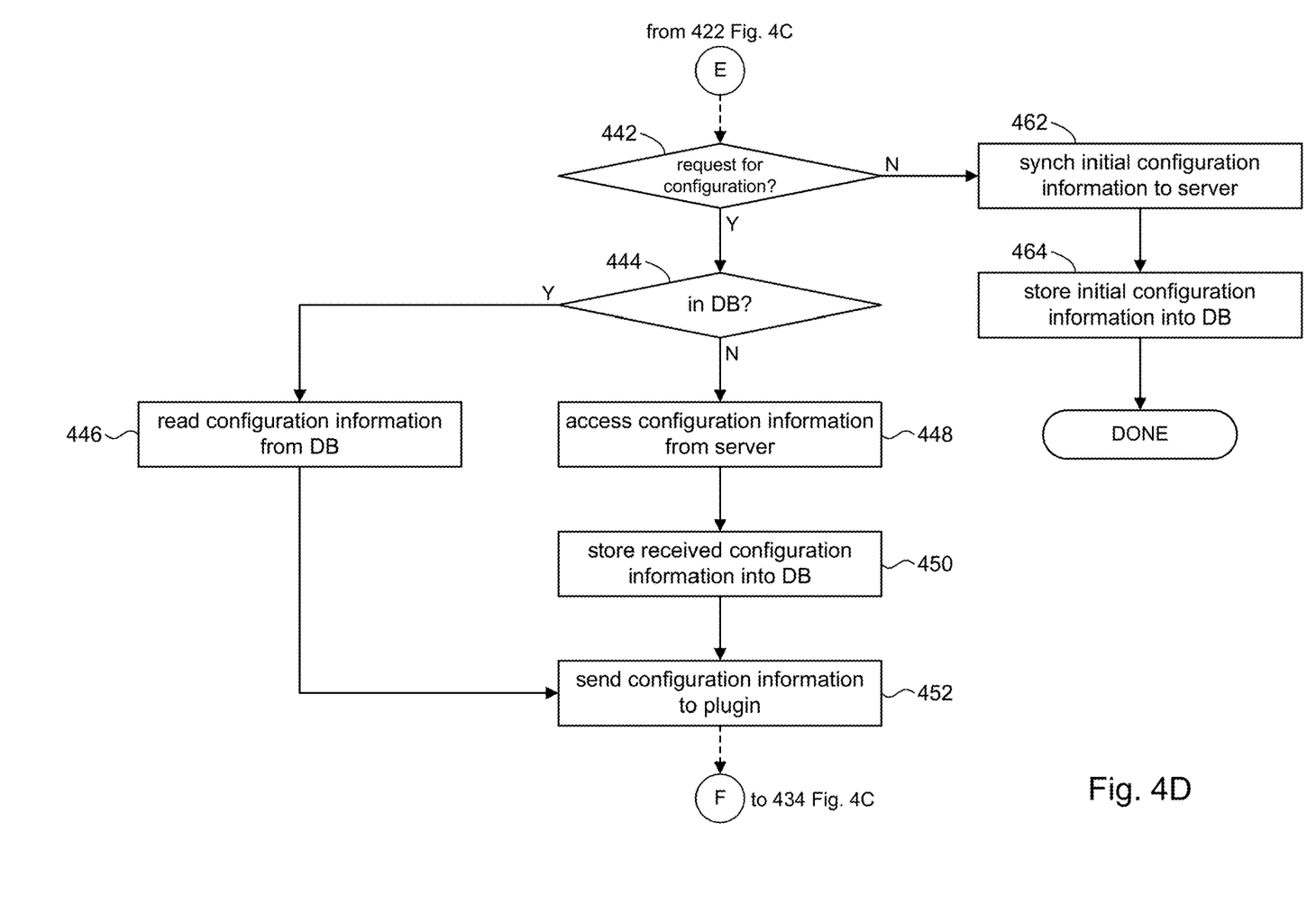
FIG. 4D illustrates high level processing for a user configuration agent in accordance with the present disclosure.

Referring now to FIG. 4D, processing in the user configuration agent (e.g., 144, FIG. 3) in accordance with the present disclosure will now be discussed. In some embodiments, for example, applications 234 may comprise computer executable program code, which when executed by a computer system (e.g., 102, FIG. 1), may cause the computer system to perform processing in accordance with FIG. 4D.

At block 442, the user configuration agent may determine if it has received a request for configuration information (Y branch) from a user configuration plugin or if it has received initial configuration information (N branch).

If initial configuration information is received (e.g., due to invoking an application for the first time), then at block 462, the user configuration agent may synchronize the initial configuration information to an external configuration server (e.g., 306, FIG. 3). Typically, this may include sending the configuration information to the external configuration server.

At block 464, the user configuration agent may store the initial configuration information into a local database (e.g., 304, FIG. 3) defined in the container. Processing of the initial configuration information may be deemed complete.

If a request for configuration information is received (Y branch, block 442), then at block 444, the user configuration agent may check the local database 304 (using information contained in the request) to determine if the requested configuration information is locally available in the database 304.

If the requested configuration information is already locally stored in the database 304 (Y branch, block 444), then at block 446, the user configuration agent may read out the requested configuration information from the database 304. It can be seen that the database 304 can alleviate the amount of network traffic between the container and the external configuration servers by locally storing configuration information when possible.

At block 452, the user configuration agent may send the configuration information accessed from the database 304 to the user configuration plugin that made the request; e.g., over a TCP/IP channel. For example, the request may include an IP address of the user configuration plugin. That IP address can be used to route the accessed configuration information to the user configuration plugin.

If the requested configuration information is not locally available in the database 304 (N branch, block 444), then at block 448, the user configuration agent may communicate with an external configuration server to obtain the requested configuration information. For example, the database 304 will not have any configuration information at the time the container engine 134 is deployed.

At block 450, the user configuration agent may store the configuration information accessed from the external configuration server into database 304. Storing the accessed configuration information can avoid subsequently having to access the external configuration server for that same configuration information. For example, when a user ends their session, the user's container and any applications running in that container will be terminated. However, any configuration information for those applications will be available in database 304 when the user starts up a subsequent session.

At block 452, the user configuration agent may send the accessed configuration information to the user configuration plugin that made the request.

Figure 5:
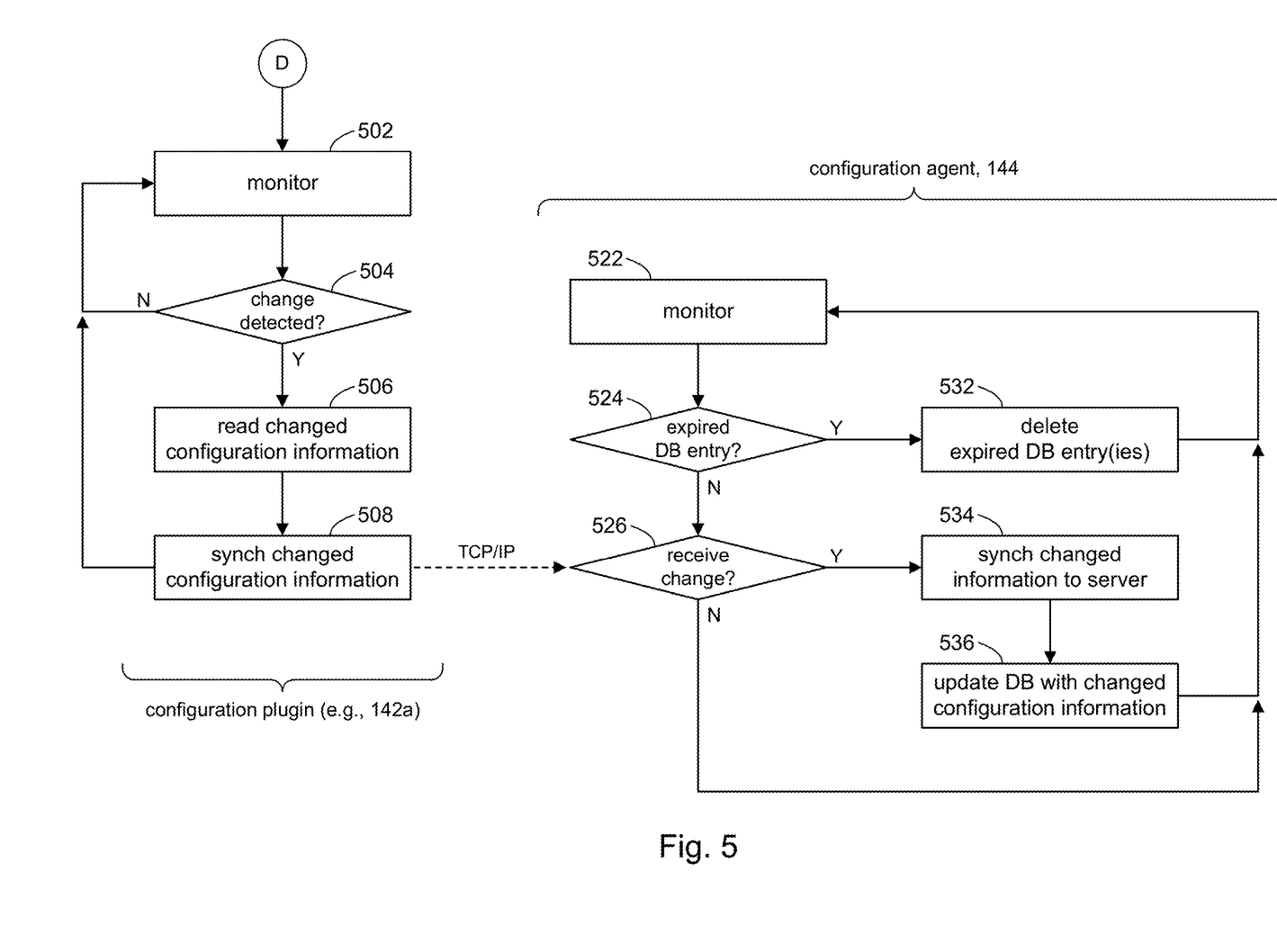
FIG. 5 illustrates high level processing for user configuration monitoring in accordance with the present disclosure.

Reference is now made to FIG. 5 for a discussion of monitoring by the user configuration plugin (e.g., 142a, FIG. 3) and the user configuration agent (e.g., 144, FIG. 3) in accordance with the present disclosure. In some embodiments, for example, applications 234 may comprise computer executable program code, which when executed by a computer system (e.g., 102, FIG. 1), may cause the computer system to perform the processing in accordance with FIG. 5.

At block 502, the user configuration plugin may monitor for changes in the configurations of applications executing in the container that the user configuration plugin is deployed in. As noted above, the configuration information for an application may be stored in any suitable manner. In some embodiments, fore example, the container OS may set up a system registry to store application configuration information. Applications may have corresponding areas in the system registry for storing their respective configuration information. Accordingly, in some embodiments the user configuration plugin may be configured to monitor the areas of the system registry that correspond to executing applications, and trigger when a write operation is made to those areas in the system registry.

Also noted above, in some embodiments, some applications may use special configuration files to store some configuration information. For example, a spreadsheet application may have one or more template spreadsheets that can be stored in special template files. The user configuration plugin may be configured to monitor the special configuration files, and trigger when the special configuration files have changed.

At block 504, when a configuration change is detected, the user configuration plugin may be triggered (Y branch). For example, when a user makes a change in the configuration of an application, the application may write to the system registry or make an update to one of its special configuration files. In a web browser, for example, the user may set up one or more tabs with home web pages in each tab. In a document editor, the user may change the default configuration such as font, page size, page view, and so on.

At block 506, the user configuration plugin may access the area in the system registry that corresponds to the application, or may access one or more of its special configuration files.

At block 508, the user configuration plugin may send the accessed information to the user configuration agent; e.g., over a TCP/IP connection. The user configuration plugin may return to block 502 to continue monitoring for changes.

At block 522, the user configuration agent may monitor the database 304 for expired configuration information. When a container and its applications have terminated (e.g., because the user has ended their session) the configuration information for those applications can be retained in the database 304. If the user subsequently resumes their session, the configuration information for the applications can be read out of the database 304 instead of being accessed from an external configuration server. To ensure that the configuration information is current, the user configuration agent may monitor the database 304 for expired configuration information.

At block 524, if any entries in the database 304 are expired (Y branch), the user configuration agent may delete (block 532) those entries. For example, entries that have not been accessed for a predetermined period of time (e.g., several hours, several days, etc.) may be deleted from the database 304. The user configuration agent may return to block 522 to continue monitoring.

At block 526, the user configuration agent may listen to a TCP/IP port for messages from a user configuration plugin deployed in a container. If the user configuration agent receives changed or updated configuration information from a user configuration plugin (Y branch), the user configuration agent may synchronize (block 534) the updated configuration information to an external configuration server. The user configuration agent may then update (block 536) the database 304 with the updated configuration information. Processing may return to block 522 to continue monitoring.

The various embodiments described herein may employ various computer-implemented operations involving data stored in computer systems. For example, these operations may require physical manipulation of physical quantities. Usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

One or more embodiments may be implemented as one or more computer programs or as one or more computer program modules embodied in one or more computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method for configuring an application with user configuration information executing in a container, the method comprising:
    deploying a container engine to execute on a first machine;
    deploying a configuration agent to execute on the first machine;
    deploying one or more containers to execute on the container engine, wherein each container performs operations including:
        the container instantiating at least one corresponding application to execute in the container;
        the container sending to the configuration agent a configuration request for configuration information relating to the application, the configuration request including information that identifies the container, information that identifies a user associated with the container, and information that identifies the application;
        the container receiving from the configuration agent configuration information relating to the user's configuration of the application; and
        the container configuring the application using the received configuration information.

2. The method of claim 1, further comprising, for each container, instantiating a configuration plugin to execute in the container, wherein the configuration plugin communicates with the configuration agent to obtain the configuration information and the configuration plugin configures the application using the received configuration information.

3. The method of claim 1, further comprising, the configuration agent receiving a request from one of the containers and in response:
    communicating with a server separate from the first machine to obtain configuration information from the server for an application in the container; and
    sending the obtained configuration information to the container.

4. The method of claim 3, further comprising storing the obtained information in a database of the first machine.

5. The method of claim 1, further comprising the configuration agent receiving a request from one of the containers and in response:
    accessing configuration information, stored on the first machine, for an application in the container; and
    sending the accessed configuration information to the container.

6. The method of claim 1, further comprising the configuration agent storing configuration information on the first machine and periodically updating the stored configuration information with information received from a server separate from the first machine.

7. The method of claim 1, further comprising the configuration agent storing configuration information on the first machine; receiving update information from a first container; and updating the stored configuration information using the update information.

8. The method of claim 1, wherein the first machine is a physical computer system, the method further comprising deploying an operating system to execute on the physical computer system and deploying the container engine to execute on the operating system.

9. The method of claim 1, wherein the first machine is a virtual machine, the method further comprising deploying a hypervisor to execute on a physical computer system and deploying the virtual machine to execute on the hypervisor.

10. A system for configuring an application with user configuration information executing in a container, the system comprising:
    a processor; and
    a computer-readable storage medium having stored thereon executable program code, the executable program code, which when executed by the processor, being configured to cause the processor to:
    deploy a container engine to execute on a first machine;
    deploy a configuration agent to execute on the first machine;
    deploy one or more containers to execute on the container engine, wherein each container performs operations to:
        instantiate at least one corresponding application to execute in the container;
        send to the configuration agent a configuration request for configuration information relating to the application, the configuration request including information that identifies the container, information that identifies a user associated with the container, and information that identifies the application;
        receive from the configuration agent configuration information relating to the user's configuration of the application; and
        configure the application using the received configuration information.

11. The system of claim 10, wherein the executable program code, which when executed by the processor, is further configured to cause the processor to instantiate, for each container, a configuration plugin to execute in the container, wherein the configuration plugin communicates with the configuration agent to obtain the configuration information and the configuration plugin configures the application using the received configuration information.

12. The system of claim 10, wherein when the configuration agent receives a request from one of the containers, the configuration agent:
    communicates with a server separate from the first machine to obtain configuration information from the server for an application in the container; and
    sends the obtained configuration information to the container.

13. The system of claim 12, wherein the obtained information is stored in a database of the first machine.

14. The system of claim 10, wherein when the configuration agent receives a request from one of the containers, the configuration agent:
    accesses configuration information, stored on the first machine, for an application in the container; and
    sends the accessed configuration information to the container.

15. The system of claim 10, wherein the configuration agent stores configuration information on the first machine and periodically updates the stored configuration information with information received from a server separate from the first machine.

16. The system of claim 10, wherein the configuration agent stores configuration information on the first machine; receives update information from a first container; and updates the stored configuration information using the update information.

17. A non-transitory computer-readable storage medium having stored thereon computer executable instructions, which when executed by a computer device, cause the computer device to:
    deploy a container engine to execute on a first machine;
    deploy a configuration agent to execute on the first machine;
    deploy one or more containers to execute on the container engine, wherein each container performs operations to:
        instantiate at least one corresponding application to execute in the container;
        send to the configuration agent a configuration request for configuration information relating to the application, the configuration request including information that identifies the container, information that identifies a user associated with the container, and information that identifies the application;
        receive from the configuration agent configuration information relating to the user's configuration of the application; and
        configure the application using the received configuration information.

18. The non-transitory computer-readable storage medium of claim 17, wherein the computer executable instructions, which when executed by the computer device, is further configured to cause the computer device to instantiate, for each container, a configuration plugin to execute in the container, wherein the configuration plugin communicates with the configuration agent to obtain the configuration information and the configuration plugin configures the application using the received configuration information.

19. The non-transitory computer-readable storage medium of claim 17, wherein when the configuration agent receives a request from one of the containers, the configuration agent:
    communicates with a server separate from the first machine to obtain configuration information from the server for an application in the container; and
    sends the obtained configuration information to the container.

20. The non-transitory computer-readable storage medium of claim 17, wherein when the configuration agent receives a request from one of the containers, the configuration agent:
 accesses configuration information, stored on the first machine, for an application in the container; and
 sends the accessed configuration information to the container.

* * * * *